(12) United States Patent
Jarjoura et al.

(10) Patent No.: US 6,931,963 B2
(45) Date of Patent: Aug. 23, 2005

(54) AUTOMATIC SHIFT KNOB ACTUATOR

(75) Inventors: Tammer Jarjoura, Macomb Township, MI (US); Byron A. Spencer, Bloomfield, MI (US); Emily Curtin, Taylor, MI (US); Calum Beattie, Windsor (CA)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/668,351

(22) Filed: Sep. 24, 2003

(65) Prior Publication Data

US 2005/0061102 A1 Mar. 24, 2005

(51) Int. Cl.⁷ .................................................. G05G 1/10
(52) U.S. Cl. ........................ 74/543; 74/523; 74/473.3; 74/538; 16/DIG. 30
(58) Field of Search .......................... 74/543, 473.25, 74/473.3, 523, 537, 538; 16/DIG. 30, 121

(56) References Cited

U.S. PATENT DOCUMENTS

| 4,896,556 A | * | 1/1990 | Takada ......................... 74/523 |
| 5,179,870 A | * | 1/1993 | Behrens et al. ........... 74/473.23 |
| 5,247,849 A | * | 9/1993 | Sato ........................... 74/473.3 |
| 5,289,735 A | * | 3/1994 | Kato et al. ..................... 74/543 |
| 5,372,051 A | * | 12/1994 | Kanematsu et al. ...... 74/473.25 |
| 5,501,120 A | * | 3/1996 | Kikuchi et al. ................ 74/543 |

FOREIGN PATENT DOCUMENTS

JP          64-67424       *  3/1989     ................. 74/543

OTHER PUBLICATIONS

Physics, Parts I and II, Author: David Halliday and Robert Resnick, Publisher: John Wiley & Sons, Inc:, 1967, pp. 109–113.*

CRC Handbook of tables for Applied Engineering Science, Editor: Ray E. Bolz and George L. Tuve, CRC Press, 1976, pp. 610 and 614.*

* cited by examiner

*Primary Examiner*—Vinh T. Luong

(57) ABSTRACT

A stick shift handle assembly has a stick shift handle and an actuator for releasing the stick shift handle for movement between a plurality of gear positions. The actuator has a housing. A sleeve is disposed between the actuator and the housing. The sleeve and the housing are made of different materials.

9 Claims, 5 Drawing Sheets

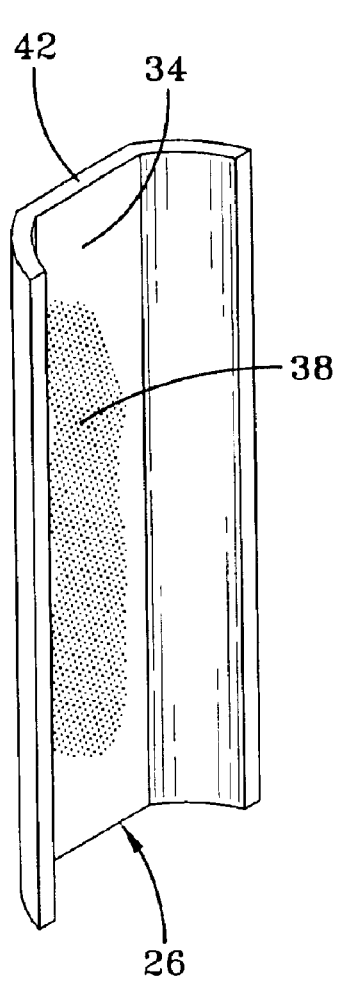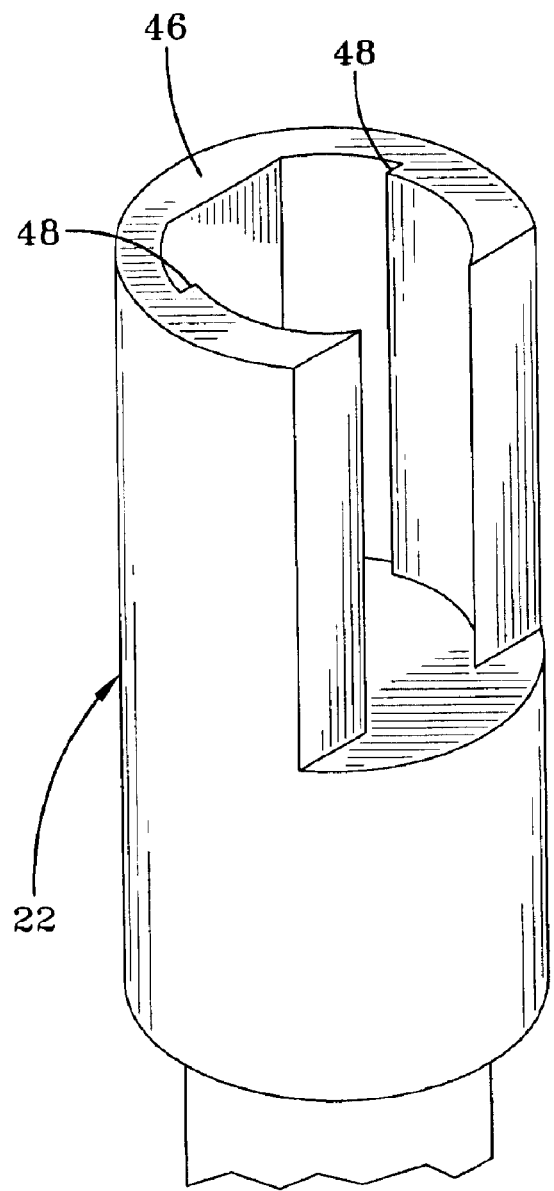
FIG-3
FIG-4

AUTOMATIC SHIFT KNOB ACTUATOR

FIELD OF THE INVENTION

This invention relates to an actuator for a stick shift handle assembly.

BACKGROUND OF THE INVENTION

A stick shift handle for an automatic transmission permits a driver to change the gears of a vehicle transmission by moving the stick shift handle between various positions. Typically, the stick shift handle is locked in a particular gear position until unlocked by the driver. The driver unlocks the stick shift handle by pressing a release button either at the front of the stick shift handle or on its side, which, in turn, causes an actuator in the stick shift handle to release the stick shift handle from a shift lock mechanism.

Problems may arise with the actuator that unlocks the stick shift handle. Specifically, the stick shift handle, which houses the actuator, is generally made from plastic and fiberglass. This material has a high coefficient of friction and causes the actuator to experience a fair amount of friction when moved. While manufacturers have sought to overcome this problem by placing lubricant between the actuator and the stick shift handle, during frequent use, the lubricant tends to migrate from the area of contact between the actuator and the stick shift handle.

In addition, for a side actuating stick shift handle, manufacturers have sought to reduce the effort of unlocking the stick shift handle by employing a cam as an actuator. To unlock the stick shift handle, the driver presses a release button, which causes pivotal movement of the cam. The cam then moves an unlocking member along a linear path. However, the pivoting action of the cam tends to force the unlocking member to move in a pivoting fashion as well. On occasion, this type of movement may cause a backlash through the release button. Manufacturers have sought to eliminate this problem by creating a notch in the cam to prevent the unlocking member from moving radially relatively to the cam. This fix is time consuming to implement.

A need therefore exists for a stick shift handle assembly that provides smooth and inexpensive actuation of a shift lock mechanism.

SUMMARY OF THE INVENTION

The present invention comprises a stick shift handle and an actuator for releasing the stick shift handle for movement between various gear positions. The actuator has a housing that is disposed within the stick shift handle. In contrast to existing stick shift handle assemblies, however, the inventive stick shift handle assembly employs a sleeve between the actuator and its housing. The sleeve has a co-efficient of friction less than the coefficient of friction of the housing or the stick shift handle. In this way, the actuator may slide on the sleeve with less frictional resistance than existing stick shift handle assemblies.

The actuator may have a flat surface that contacts a flat surface of the sleeve. Lubricant may be provided between the flat surfaces to facilitate movement of the actuator within its housing. The flat surfaces ensure that the lubricant will not migrate from the area of contact.

In addition, the sleeve may have a particular shape to match a shape of the housing. In this way, the sleeve will not move within the housing. The stick shift handle assembly may also employ a motion transmitting member, such as a swizzle stick, to unlock a shift lock mechanism. The actuator may also have a button, which has a sloped surface in contact with another sloped surface of the actuator to allow motion to be transmitted from the button to the actuator in a smooth fashion.

For a side-actuating stick shift handle assembly, the inventive stick shift handle assembly employs a stick shift handle that moves between the various gear positions along a first axis. Unlike a front actuation stick shift handle assembly, the side actuation stick shift handle uses an actuator that unlocks the stick shift handle by moving along a second axis transverse to the first axis. The actuator has a first member that moves along this second axis. In addition, a second member moves along a third axis to disengage the shift lock mechanism. The first member has a first sloped surface while the second member has a second sloped surface. The first member transmits motion to the second member through the sloped surfaces. In this way, motion may be transmitted along two different paths with little resistance.

The first slope surface may be a rounded surface or an inclined surface. The first member may have a projection that fits into a groove of the housing to prevent rotation of the first member within its housing. In addition, the housing may comprise a first portion extending along the second axis and a second portion extending along the third axis.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 3 illustrates the sleeve of FIGS. 1 and 2 with lubricant.

FIG. 4 illustrates the housing of FIGS. 1 and 2.

DETAILED DESCRIPTION OF THE INVENTION

Figure 1:
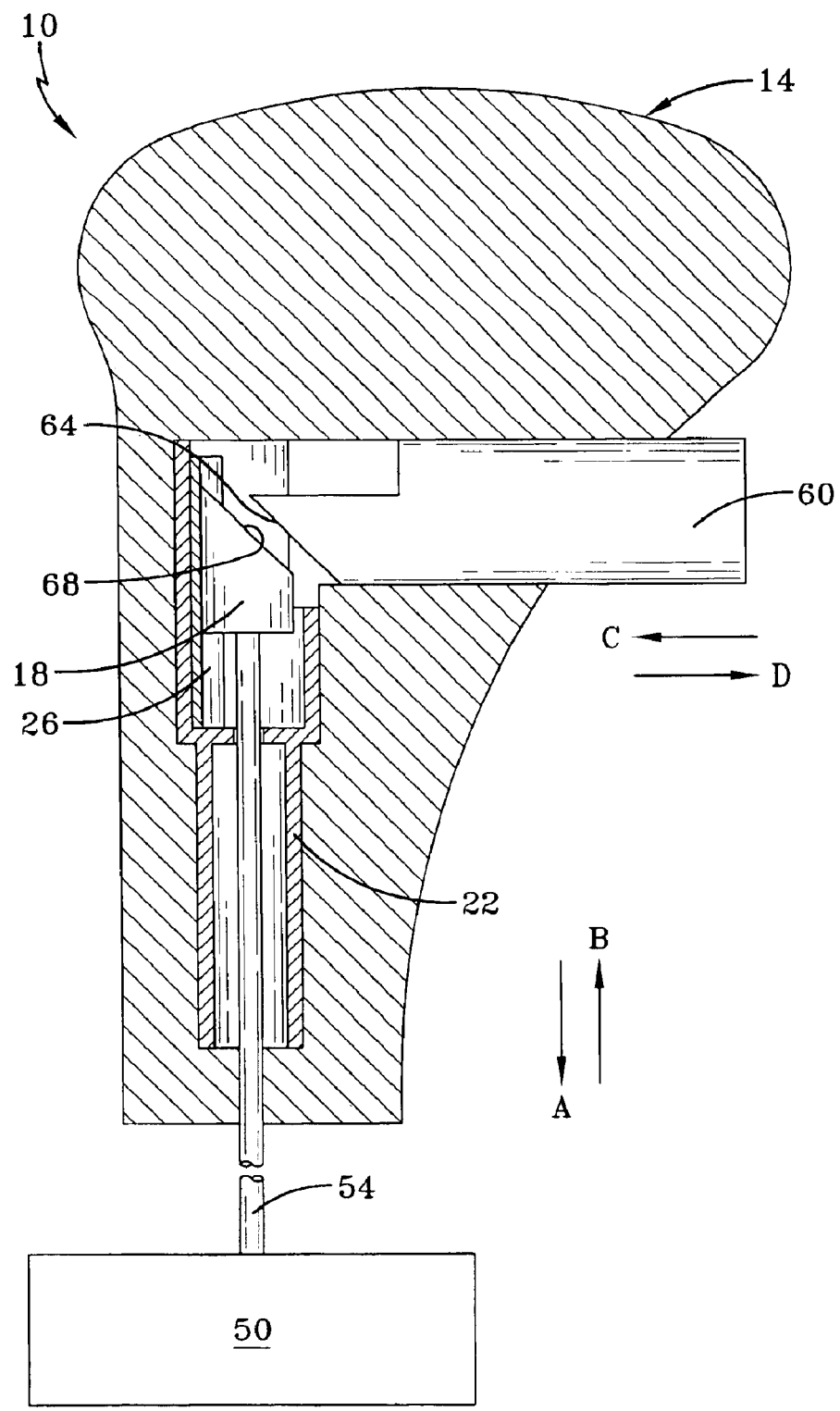
FIG. 1 illustrates a stick shift handle assembly of a first embodiment of the invention, showing actuator and sleeve.

FIG. 1 illustrates a cross-sectional view of inventive stick shift handle assembly 10. Like existing stick shift handle assemblies, inventive stick shift handle assembly 10 has stick shift handle 14, which allows a driver to shift a vehicle transmission through its various gears. Stick shift handle 14 is prevented from moving from gear shift position to gear shift position by shift lock mechanism 50, here shown schematically.

To release stick shift handle 14 for movement between the various gear shift positions, a driver presses button 60 in the direction of arrow C. Button 60 has first sloped surface 64, such as a rounded or inclined surface, which also moves in the direction of arrow C to contact second sloped surface 68, here another rounded or inclined surface, of actuator 18. Actuator 18 is housed in housing 22, which may be a separate part or be part of stick shift handle 14. Actuator 18 then moves in the direction of arrow A and transmits its motion to motion transmitting member 54 to release shift lock mechanism 50. Following movement of stick shift handle 14 to its proper gear shift position, motion transmitting member 54 and actuator 18 move in the direction of arrow B and return button 60 to its original position along arrow D.

In contrast to existing stick shift handle assemblies, inventive stick shift handle assembly 10 employs sleeve 26 between actuator 18 and housing 22. Sleeve 26 comprises a material having a lower coefficient of friction $C_1$ than the coefficient of friction of housing 22, $C_2$. Sleeve 26 thus offers a low amount of frictional resistance to actuator 18 within housing 22.

Figure 2:
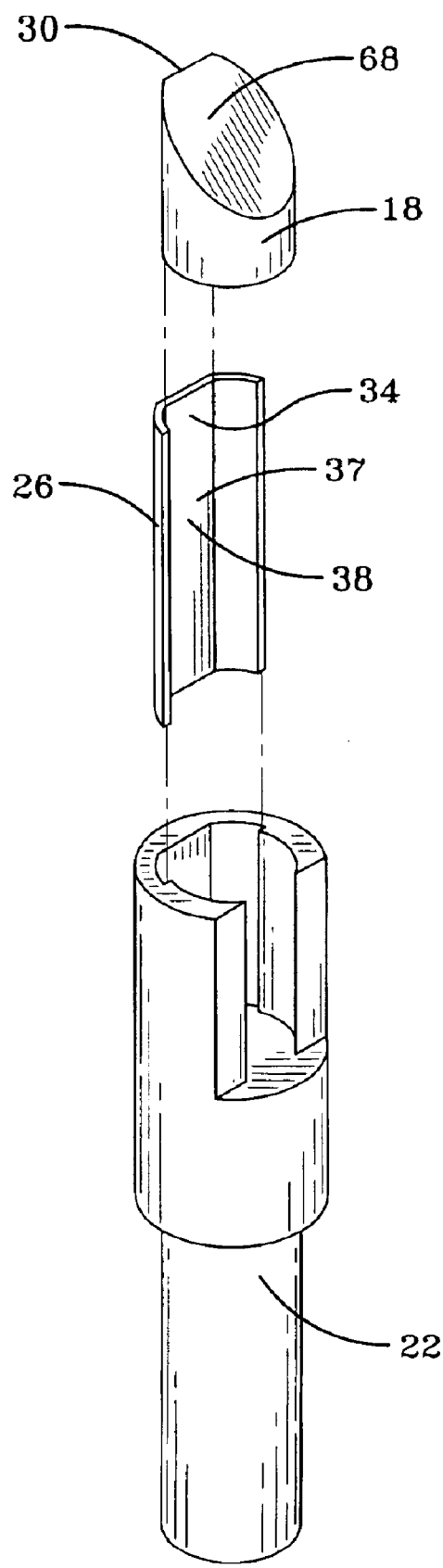
FIG. 2 illustrates an exploded view of the stick shift handle of FIG. 1, highlighting actuator and sleeve.

As shown in FIG. 2, actuator 18 has first planar area 30 that fits on top of second planar area 34 of sleeve 26. Accordingly, first planar area 30 slides on second planar area 34. To further reduce friction between actuator 18 and sleeve 26, lubricant 37 is placed on sleeve 26 at location 38 to allow actuator 18 to slide on sleeve 26 more smoothly. Because lubricant 37 is placed between first planar area 30 and second planar area 34, movement of actuator 18 on sleeve 26 causes lubricant to spread evenly over the planar areas 30, 34 rather than in one particular area. In this way, sleeve 26 prevents the migration of lubricant away from the area of contact between actuator 18 and sleeve 26.

As shown in FIG. 3, sleeve 26 has first cross-section 42 of a particular shape to match, as shown in FIG. 4, the shape of second cross-section 46 of housing 22. Moreover, second cross-section 46 has shoulders 48. By having shoulders 48, sleeve 26 is prevented from rotating within housing 22 and is, in fact, locked in place against rotational movement within housing 22.

Figure 5:
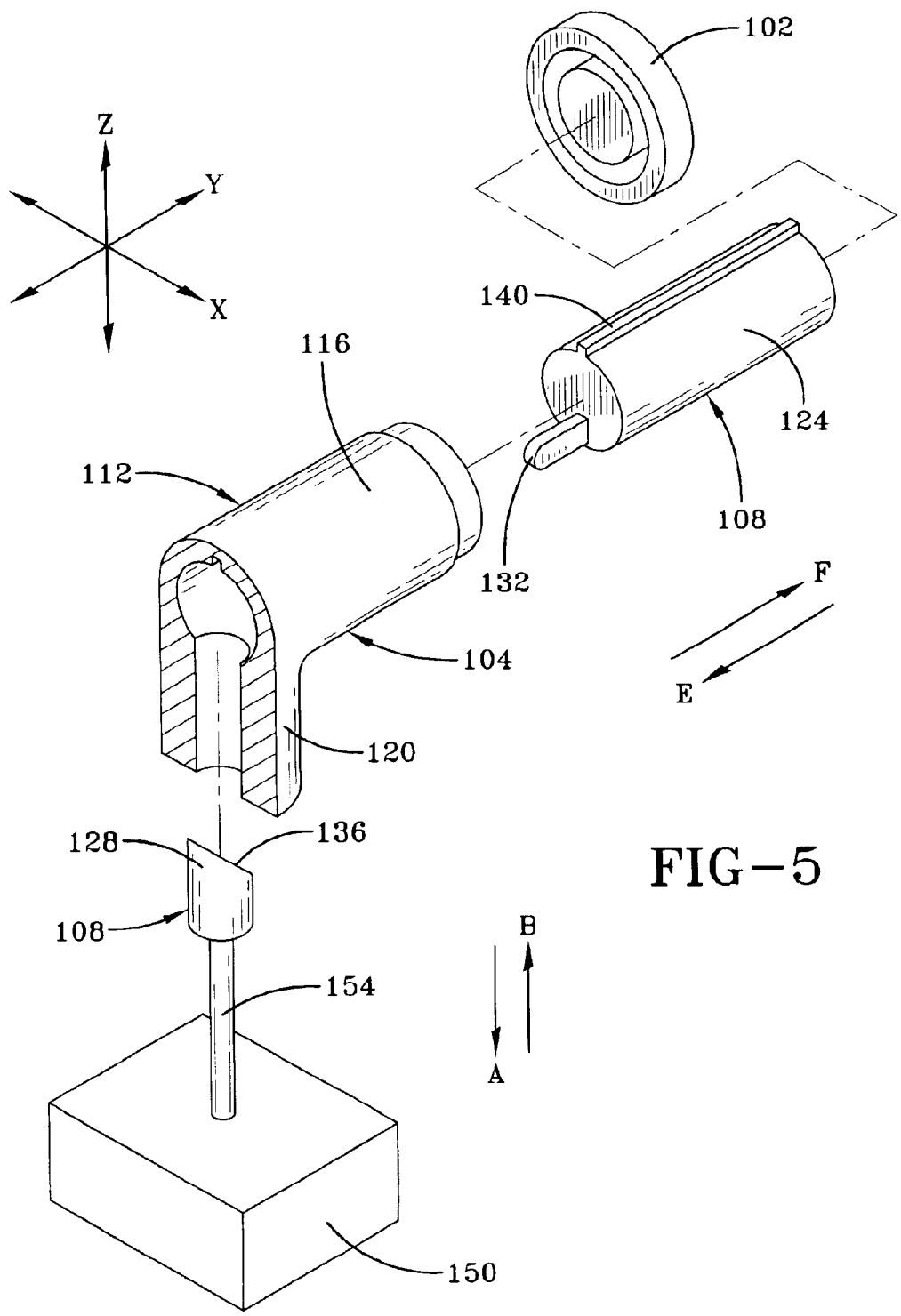
FIG. 5 illustrates a second embodiment of the invention, a side actuation stick shift handle assembly.
Figure 6:
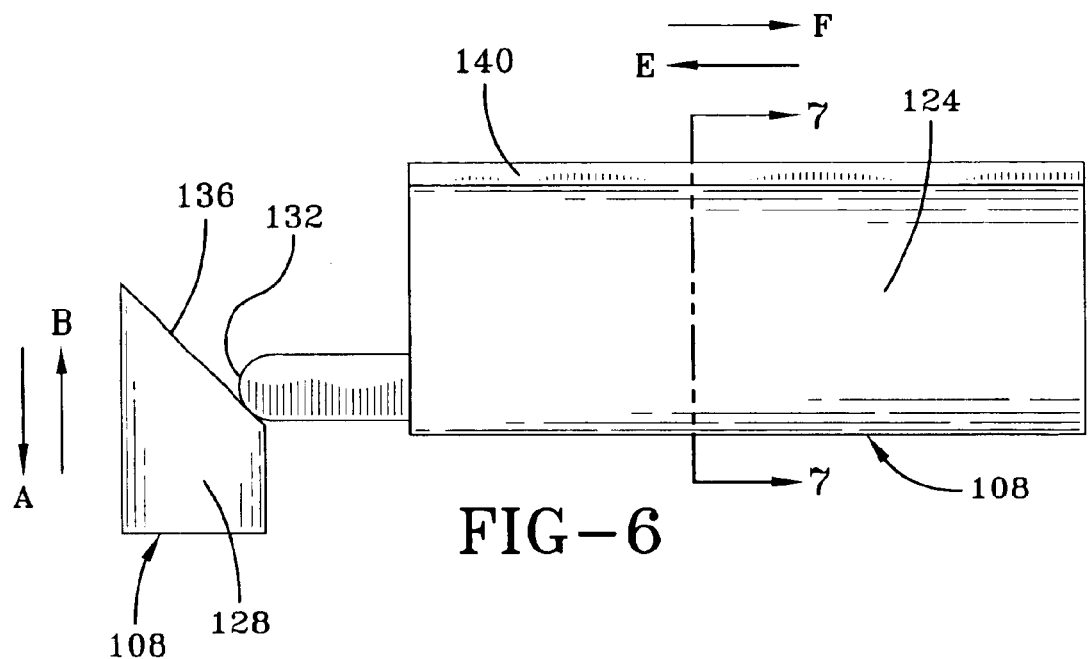
FIG. 6 illustrates the actuator of FIG. 5.
Figure 7:
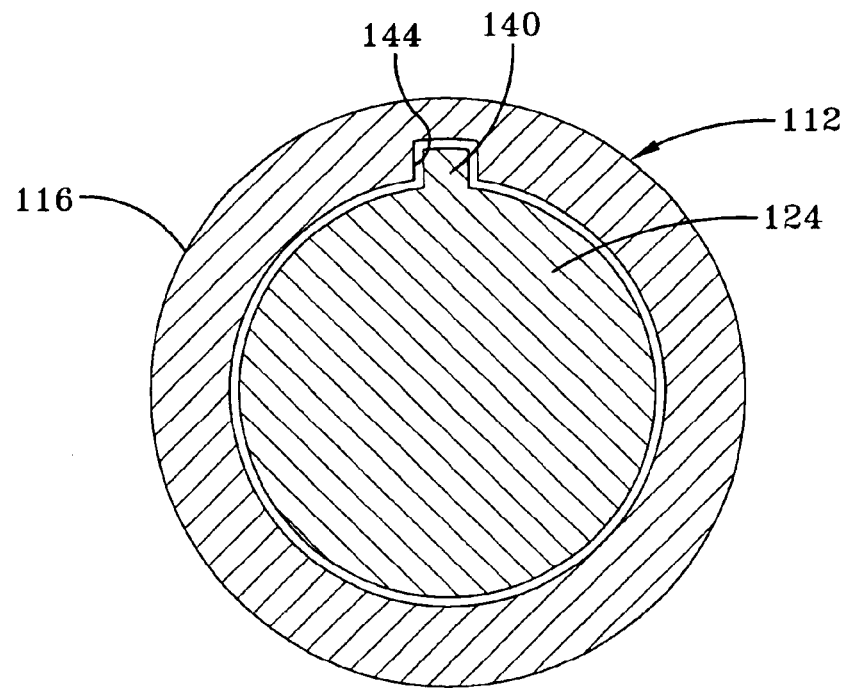
FIG. 7 illustrates a cross-sectional view of the actuator of FIGS. 5 and 6 in its housing.

FIGS. 5–7 illustrate side actuation shift assembly 100. Inventive stick shift handle assembly 100 has stick shift handle 104. Stick shift handle 104 moves between gear shift positions along the X axis. As in the previous embodiment, stick shift handle assembly 100 is prevented from moving between gear positions by shift lock mechanism 150.

To release stick shift handle 104 for movement, a driver presses button 102 in the direction of arrow E along the Y axis, as axis transverse to the X axis, to contact actuator 108. Actuator 108 comprises first member 124, which extends along the Y axis within first portion 116 of housing 112, as well as second member 128, which extends along the Z axis, an axis transverse to both the X and Y axes, within second portion 120 of housing 112. Movement of button 102 forces movement of first member 124 in the direction of arrow E.

As shown in FIG. 6, first member 124 has first sloped surface 132, such as a rounded or inclined surface, while second member 128 has second sloped surface 136, such as a rounded or inclined surface. Accordingly, movement of first member 124 in the direction of arrow E causes first sloped surface 132 to contact second sloped surface 136. Motion is transmitted from first member 124 along the direction of arrow E to second member 128 along the direction of arrow A, along the Z axis, through first sloped surface 132 and second sloped surface 136. Second member 128 moves motion transmitting member 154 to release shift lock mechanism 150 in the direction of arrow A. Once the gear shift position has been changed, motion transmitting member 154 returns along the direction of arrow B to its original position. Motion transmitting member 154 moves second member 128 in this same direction, which ultimately causes first member 124 and button 102 to return to their original positions along the direction of arrow F. This return and release function can be as known in the prior art. Thus, in contrast to other side actuation stick shift handle assemblies, inventive stick shift handle assembly 100 eliminates the cam as well as its pivoting action. In this way, stick shift handle assembly 100 eliminates the backlash associated with other side actuation stick shift handle assemblies.

In addition, first member 124 is provided with protrusion 140, as shown in FIGS. 6 and 7. As shown in FIG. 7, first portion 116 of housing 112 is provided with groove 144 to receive protrusion 140. In this way, first member 124 is prevented from rotating within first portion 116 of housing 112.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A stick shift handle assembly comprising:
   a stick shift handle;
   an actuator for releasing said stick shift handle to allow movement of the stick shift handle, the actuator having a first planar area;
   a housing for said actuator;
   a sleeve disposed between said actuator and said housing, the sleeve having a second planar area, wherein said sleeve and said housing comprise different materials; and
   a lubricant disposed between said first planar area and said second planar area with the first planar area able to slide on the second planar area.

2. The stick shift handle assembly of claim 1 wherein said sleeve has a first cross-section of a first shape to match a second shape of a second cross-section of said housing, said first shape matching said second shape to prevent movement of said sleeve within said housing.

3. The stick shift handle assembly of claim 1 including a shift lock mechanism in communication with said actuator, said shift lock mechanism preventing movement of said stick shift handle between the plurality of gear positions.

4. The stick shift handle assembly of claim 3 including a motion-transmitting member disposed between said actuator and said shift lock mechanism.

5. The stick shift handle assembly of claim 1 including a button in contact with said actuator.

6. The stick shift handle assembly of claim 5 wherein said button comprises a first sloped surface in contact with a second sloped surface on said actuator.

7. A stick shift handle assembly comprising:
   a stick shift handle;
   an actuator for releasing movement of said stick shift handle, said actuator having a first planar area;
   a housing for said actuator; and
   a sleeve having a second planar area in contact with said first planar area, said sleeve disposed between said actuator and said housing wherein said sleeve and said housing comprise different materials and wherein said sleeve has a first cross-section of a first shape to match a second shape of a second cross-section of said housing, said first shape matching said second shape to prevent movement of said sleeve within said housing; and a button having a first sloped surface in contact with a second sloped surface on said actuator.

8. The stick shift handle assembly of claim 7 including a shift lock mechanism in communication with said actuator, said shift lock mechanism for preventing movement of the stick shift handle.

9. The stick shift handle assembly of claim 7 including a motion-transmitting member disposed between said actuator and said shift lock mechanism.

* * * * *